United States Patent
Joksch et al.

(10) Patent No.: US 12,214,387 B2
(45) Date of Patent: Feb. 4, 2025

(54) SYSTEM AND METHOD FOR CREATING AND PERFORMING AN INSTALLATION CLEANING PROCESS FOR PROCESS INSTALLATIONS

(71) Applicant: Siemens Aktiengesellschaft, Munich (DE)

(72) Inventors: Martin Joksch, St. Andrä-Wödern (AT); Vladimir Zahorcak, Borinka (SK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 222 days.

(21) Appl. No.: 16/640,503

(22) PCT Filed: Aug. 23, 2017

(86) PCT No.: PCT/EP2017/071220
§ 371 (c)(1),
(2) Date: Feb. 20, 2020

(87) PCT Pub. No.: WO2019/037842
PCT Pub. Date: Feb. 28, 2019

(65) Prior Publication Data
US 2020/0360973 A1 Nov. 19, 2020

(51) Int. Cl.
*B08B 9/032* (2006.01)
*B08B 13/00* (2006.01)
(Continued)

(52) U.S. Cl.
CPC ............ *B08B 9/0325* (2013.01); *B08B 13/00* (2013.01); *G05B 19/41865* (2013.01); *G06Q 10/0631* (2013.01)

(58) Field of Classification Search
CPC .. B08B 9/0325; B08B 13/00; G06Q 10/0631; G05B 19/41865
See application file for complete search history.

(56) References Cited

U.S. PATENT DOCUMENTS 10,315,235 B2 6/2019 Curran et al.
10,365,635 B2 7/2019 Zahorcak
(Continued)

FOREIGN PATENT DOCUMENTS

CN 105320234 2/2016
CN 205613771 U 10/2016
(Continued)

OTHER PUBLICATIONS

Office Action dated Jul. 15, 2021 issued in Chinese Patent Application No. 201780094158.1.
(Continued)

*Primary Examiner* — Douglas Lee
(74) *Attorney, Agent, or Firm* — Cozen O'Connor

(57) ABSTRACT

Method and system for creating and implementing a cleaning-in-place installation cleaning process for a process installation, wherein an installation to be cleaned is represented as process modules that each include an item of self-description information with respect to the respective cleaning properties and that are each configured to transmit the self-description information, where the system has at least one auxiliary module that provides auxiliary services for the installation cleaning process, and a process planning unit that has an item of cleaning process information having cleaning steps needed at least for the installation cleaning process and model descriptions of cleaning efficiency for each cleaning step, and the process planning unit determines a cleaning schedule in a partially automated manner on a system-specific basis based on the cleaning process information supplemented with self-description information (Continued)

relating to the process modules and taking into account information relating to the at least one auxiliary module.

16 Claims, 1 Drawing Sheet

(51) Int. Cl.
    *G05B 19/418* (2006.01)
    *G06Q 10/0631* (2023.01)

(56) References Cited

U.S. PATENT DOCUMENTS

| | | | |
|---|---|---|---|
| 10,755,210 B2 | 8/2020 | Curran et al. | |
| 2013/0019900 A1* | 1/2013 | Ehrmann | F04C 29/0092 |
| | | | 134/102.1 |
| 2014/0352728 A1* | 12/2014 | Svensson | A23C 7/02 |
| | | | 99/452 |
| 2016/0045943 A1* | 2/2016 | Curran | B08B 9/027 |
| | | | 134/18 |
| 2016/0048779 A1 | 2/2016 | Curran et al. | |
| 2017/0322542 A1 | 11/2017 | Zahorcak | |
| 2020/0364633 A1 | 11/2020 | Curran et al. | |

FOREIGN PATENT DOCUMENTS

| | | | |
|---|---|---|---|
| CN | 205672265 U | 11/2016 | |
| CN | 106575426 | 4/2017 | |
| CN | 106605244 | 4/2017 | |
| CN | 107003646 | 8/2017 | |
| EP | 0903320 | 3/1999 | |
| JP | 2011-092843 | 5/2011 | |
| JP | 60-94981 B1 | 3/2017 | |
| WO | WO-2012058143 A2 * | 5/2012 | B08B 9/027 |
| WO | 2016074728 | 5/2016 | |

OTHER PUBLICATIONS

PCT International Search Report based on PCT/EP2017/071220 filed Aug. 23, 2017.

* cited by examiner

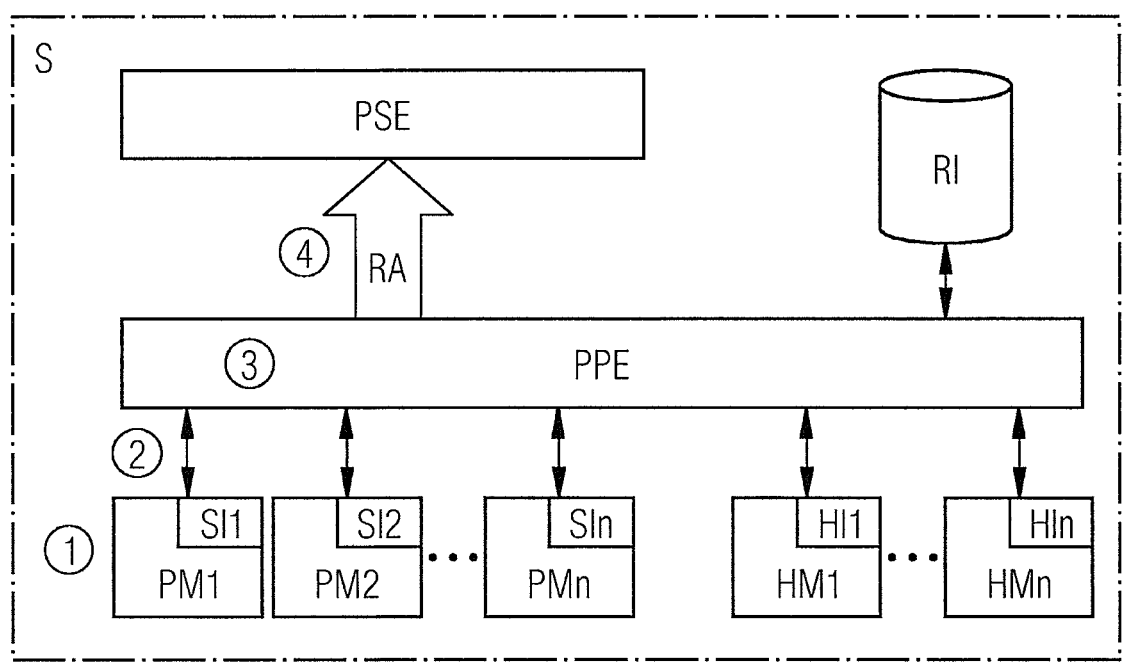

SYSTEM AND METHOD FOR CREATING AND PERFORMING AN INSTALLATION CLEANING PROCESS FOR PROCESS INSTALLATIONS

CROSS-REFERENCE TO RELATED APPLICATION

This is a U.S. national stage of application No. PCT/EP2017/071220 filed Aug. 23, 2017.

BACKGROUND OF THE INVENTION

1. Field of the Invention

The present invention relates to a system and method for creating and performing an installation cleaning process for a process installation, where the installation cleaning process is formed as a cleaning-in-place or CIP process, and where the process installation is set up for cleaning via a cleaning-in-place (CIP) process or is CIP-compatible.

2. Description of the Related Art

Cleaning-in-place methods or cleaning-in-place processes that are used for the cleaning of process installations are now well established in the process industry (e.g., pharmaceutical and/or chemical industry, biotechnology, or food industry). This is also referred to as location-based cleaning. In addition to the term cleaning-in-place (CIP), the term sterilization-in-place (SIP) is also used for location-based cleaning methods in process installations, in particular in pharmaceutical production installations and biotechnology installations. Cleaning-in-place (CIP) is often used as a general term in this case, and also covers the aspects of SIP.

In the context of a CIP method, as per the definition, an installation is cleaned without substantial disassembly on those surfaces that come into contact with products (e.g., foodstuffs, pharmaceutical, or biotechnological or chemical products) or mediums that are relevant to the production (e.g., substrate, nutrient solution, or ingredients). This means in particular that the internal surfaces of all relevant installation parts (e.g., containers, pipes, filters, tanks, kettles, or valves) are cleaned during a CIP process. If the CIP method also includes SIP aspects, all installation surfaces coming into contact with products are not only cleaned but also sterilized without substantial disassembly. In the following, the term cleaning-in-place or CIP is used as a general term which also includes sterilization-in-place (SIP) aspects, because both processes are closely related and have the same structure and/or execution in terms of process sequence.

The success of an installation cleaning process is determined primarily by precise specification of four parameters or factors: temperature, mechanical action (i.e., strength and use of mechanical energy; dissolution of dirt; contact with the cleaning agent), duration of action and chemistry (i.e., which cleaning agent or solvent is used and in what concentration). In the case of steam sterilization, for example, the pressure assumes the function of the mechanical action. The four factors (temperature, mechanical action, duration of action and cleaning agent/chemistry) can be adjusted, e.g., independently of each other. Each of the factors can to some extent compensate the others. In order to achieve a specific cleaning success, the four factors must be present in an exact ratio. This relationship is also referred to as Sinner's circle.

Sinner's circle is an active mechanism via which cleaning sequences and processes can be organized and implemented, e.g., in commercial cleaning, building cleaning, disinfection, dishwashers and/or washing machines. For example, gentle cleaning can be achieved by mild chemistry, low temperature and long duration of action. In the case of rapid cleaning, e.g., an aggressive chemistry at high temperature with a relatively short duration of action is used. The same cleaning success can be achieved in both cases, for example.

When using a cleaning-in-place (CIP) process, the cleaning of a process installation is generally effected firstly by the circulation of cleaning solutions through installation parts such as pipes, pumps, valves, or containers. In addition, use is also made of spray devices (e.g., spray nozzles, or blast-cleaning jets), via which the cleaning agent is distributed over the surface regions or inner walls of a device or installation part (e.g., kettle, tank, or container). In addition to the circulation and/or application of the cleaning agent in the whole installation, a cleaning procedure can also include steps such as the preparation of the cleaning agent to a specified concentration, heating of the cleaning agent and/or finally drying of the cleaned installation parts to a desired degree of dryness.

In the context of a cleaning-in-place (CIP) process, the cleaning usually occurs in a plurality of steps. A CIP process may comprise the following steps, for example, pre-rinsing to remove rough soiling; cleaning phase with an alkaline cleaning agent; rinsing out the alkaline cleaning agent, e.g., via a water/clear rinse cycle; acidification or acid rinsing; rinsing out the acid, e.g., via a water/clear rinse cycle; high-quality water/clear rinse cycle followed by emptying; and drying by heat or rinsing with nitrogen.

Furthermore, after rinsing out the acid, a disinfection step can also be provided in order to kill off any microbes with associated rinsing out of the disinfection agent, e.g., when using a CIP process in the food industry.

When creating a CIP framework or CIP process for a process installation, in addition to the steps listed above for the cleaning procedure, it is also necessary to take installation-specific factors into consideration. For example, it must be ensured that the cleaning agent flows through all installation parts and that no hollow spaces and/or dead regions are missed. It is moreover important, for example, to maintain a turbulent flow in pipelines of the installation to achieve effective cleaning. For this purpose, a flow speed of the cleaning agent is required, for example, which is high enough for the purpose of cleaning but which must not be so high in any part of the pipelines as to result in "cavitations" that cause damage in the pipeline system. In order to ensure this, CIP frameworks usually require complicated flow calculations, often tailored to the particular installation.

Furthermore, validation of the CIP process is required in an environment that is regulated by "Good Manufacturing Practice" or GMP. In this case, GMP is understood to mean guidelines for the quality assurance of production sequences and the production environment in the process industry, primarily in pharmaceutical manufacturing but also in the manufacture of cosmetics, foodstuffs and animal feed.

Various approaches are known today for the implementation of CIP processes in process installations. There are, e.g., explicit CIP installations or CIP systems that are attached to or installed at the process installation to be cleaned. These CIP installations comprise, e.g., tanks or containers for the liquids that are required for the cleaning, pumps, and at least one control unit for carrying out the installation cleaning process. Such CIP systems are disclosed in, e.g., the publications DE 10 2015 209 355 A1 or WO 2015/192254 A1. Explicit CIP installations are used primarily for smaller installations, such as in the food industry, and provide all of the process steps required for cleaning. However, when using an explicit or external CIP system, it is not possible without costly engineering and/or evaluation to say whether the installation cleaning process will achieve the required results or the respective process installation is CIP-compatible, or whether, e.g., installation parts cannot be cleaned by the CIP process. CIP-compatible means that, e.g., by virtue of its geometric structure and the materials used, the respective process installation is suitable for cleaning by means of a CIP process.

The implementation of CIP processes in process installations can be made easier in the installation itself by using CIP-compatible components, for example, (e.g., valves). Such CIP-compatible components can be cleaned with ease, e.g., by virtue of their geometric structure and the material used. They can also have, e.g., dedicated control lines that allow inclusion or selection by the CIP system during the cleaning. It is nonetheless often necessary here likewise to perform costly engineering of the CIP process to achieve a desired cleaning result of the installation and to take the CIP-compatible components into consideration accordingly.

In the case of complex process installations such as those used in, e.g., the pharmaceutical industry for cleaning a product (e.g., filter installations, or chromatography systems), e.g., CIP functionality is often integrated. In other words, such installations or installation parts can clean themselves and therefore need only be supplied with the corresponding cleaning agents. For complex process installations, the CIP process therefore often must be created via costly and generally installation-specific engineering, in just the same way as the actual production process.

It is not unusual for pre-validation studies to be required in the case of simple and complex process installations alike to test the cleaning of individual installation parts. The cleaning process or CIP process and any hardware and software required for this purpose usually has to be adapted in an installation-specific and customer-specific manner by means of costly engineering, including when an installation is, e.g., converted or modified for the production of another product. The cost of creating and implementing a CIP process can in some cases be, e.g., of the same magnitude as the cost of creating the actual production process.

SUMMARY OF THE INVENTION

In view of the foregoing, it is therefore an object of the invention provide a system and an associated method for creating and implementing a CIP cleaning process for process installations, via which an installation cleaning process with satisfactory cleaning quality can be created and performed simply and at low cost for the respective process installation, or for changes in the installation configuration, in an installation-specific and at least partly automated manner.

This and other objects and advantages are achieved in accordance with the invention by a method and system in which a process installation to be cleaned is represented digitally by a plurality of process modules. Stored in each of the process modules is self-description information relating to the particular cleaning properties of the respective process module, such as autonomous cleaning sequences, cleaning paths and interfaces for inlet and outlet of cleaning agents and/or rinsing agents. Furthermore, each process module is configured to transmit or share the respective self-description information. The inventive system also has at least one auxiliary module, which provides auxiliary services to the installation cleaning process, such as supplying the cleaning agents and/or rinsing agents, storing and/or preparing cleaning agents and/or rinsing agents that are used, controlling pumps for cleaning agents and rinsing agents. The at least one auxiliary module is also configured to transmit or share information about the respective auxiliary services. Also provided is a process planning unit, which has access to installation cleaning process information. Here, the cleaning process information comprises at least the cleaning steps that are required for the installation cleaning process and model descriptions of cleaning efficiency for each cleaning step. The process planning unit is also configured to determine an installation-specific cleaning schedule based on the cleaning process information, the self-description information of the process modules, and the information of the at least one auxiliary module.

The main aspect of the present invention is that, with respect to the cleaning process for the installation or with respect to the cleaning-in-place process, a virtual or digital twin of the process installation is created, with which it is possible in an automated or at least partly automated manner to create a CIP cleaning schedule for the respective installation and, if applicable, solely for installation parts. Using the inventive system, it is possible to significantly reduce the total cost of creating a CIP framework for a process installation. In particular, it is also possible in the event of changes to the product that is produced by the installation and/or in the event of changes to the installation configuration, to adapt the CIP framework or the specific cleaning schedule to the new cleaning conditions (e.g., new process modules, or new or modified cleaning paths) in a rapid and at least partly automated manner.

The installation-specific cleaning schedule created by the inventive system can be executed virtually with the aid of the inventive system. It is therefore possible, for example, to test whether all components of the process installation are included in the cleaning. It is thereby possible, for example, at an early stage to detect and correct errors in the creation of the CIP framework (e.g., erroneous assumptions in self-description information and/or cleaning process information) and/or errors in the configuration of the real installation with respect to the so-called CIP compatibility. It is moreover possible to calculate resources (e.g., cleaning agents, or rinsing agents) that are required for the respective specific cleaning schedule or to establish whether existing resources are sufficient. It is also possible to optimize the respective cleaning schedule for minimal resource consumption, for example.

The cleaning schedule that has been determined can then, after checking for freedom from errors correspondingly, be transferred directly and without significant engineering cost to the respective real installation and corresponding cleaning-in-place can be performed there in accordance with the installation-specific cleaning schedule that has been determined. For this purpose, provision is ideally made for a process control unit to which an installation-specific cleaning schedule that has been determined can be supplied for testing and execution in the real process installation.

If the cleaning results are unsatisfactory, either the self-description information of the process modules or the cleaning process information stored in the process planning unit can be adapted by means of corresponding corrections (e.g., correction of erroneous assumptions in the model descriptions of the cleaning efficiency, or correction of material data). Following the adaptation, a new cleaning schedule can be determined by the inventive system, thereby improving and optimizing the CIP process.

By virtue of the self-description information of the process modules and the cleaning process information that is stored in the process planning unit, the respective installation-specific CIP process or cleaning schedule is well documented. It is therefore possible in the case of, e.g., unsatisfactory cleaning results for causes to be ascertained quickly and remedied via corresponding corrections. Furthermore, the documentation can also be used as a basis for validation methods, e.g., for operation of the installation in a "Good Manufacturing Practice" environment. Furthermore, the inventive system allows CIP processes or cleaning schedules to be optimized very easily during their creation according to various considerations (e.g., resource cost, or time required), because all installation-specific information is available by virtue of the self-description information of the respective process modules.

Process modules on which the respective process installation is digitally represented can describe the widest variety of process installation components or entities that must be cleaned. Process modules can represent, e.g., installation components such as kettles, tanks, containers, or filters, including associated pipelines, valves, or interfaces to other installation components. The installation components described by process modules must be constructed such that they can be cleaned via a CIP process or are CIP-compatible. In other words, the installation components should be constructed such that any surface to be cleaned can be reached and cleaned by cleaning agents and/or rinsing agents via corresponding access points, and that materials are used that can be cleaned via a CIP process. In particular, the installation components should not include any dead regions and/or hollow spaces that cannot be flushed. Furthermore, each installation component described as a process module should have corresponding access points (interfaces) for inlets and outlets of cleaning agents and rinsing agents. Moreover, it is important for the respective installation components and/or the entire process installation to be constructed such that a corresponding turbulent flow can be achieved for cleaning via flushing in the respective installation components, or that installation components which are not suitable for cleaning via flushing (e.g., kettles, or tanks) have suitable cleaning apparatus (e.g., spray devices). The corresponding information is then stored in the self-description information for each process module.

In accordance with an appropriate embodiment of the invention, the self-description information of the respective process module to be cleaned therefore comprises at least a description of autonomous cleaning sequences, such as use of spray devices, a description of interfaces used for the cleaning (e.g., inlets and outlets of cleaning agents and/or rinsing agents, in particular for self-cleaning via, e.g., a spray device) and a definition of cleaning paths, which includes all possible paths within the process module and all interfaces (for inlet and outlet of cleaning agents and/or rinsing agents). Furthermore, the self-description information should ideally also comprise status information relating to the respective cleaning status and a respective dirt saturation of the respective cleaning paths and interfaces of the corresponding process module.

Furthermore, the cleaning paths also have properties that are advantageously stored and managed in the self-description information of the respective process module. The self-description information of the respective process module therefore ideally additionally comprises information for each associated cleaning path. By virtue of this information, it is possible to determine values for cleaning-specific parameters for the respective process module and the associated cleaning paths based on the model descriptions of the cleaning efficiency for each cleaning step. The information for the respective cleaning paths may comprise, for example, a cleaning status (e.g. clean, or not cleaned) and/or properties of the respective cleaning path, which can be used to calculate a minimum throughput volume or flow required for the cleaning and to calculate a maximum permissible throughput volume or flow. Furthermore, it is also possible to store material properties, such as surface roughness or other specific factors, which have an influence on the cleaning time.

Cleaning process information, in particular a description of the required installation cleaning process for each material and/or substance processed in the installation or the respective process module, is managed in the process planning unit. Here, the cleaning process information comprises firstly a description of the cleaning steps that are usually required for the installation cleaning process, such as alkaline rinse, clear rinse, acid rinse, clear rinse, or steam sterilization. Here, the cleaning steps are dependent on the respective installation or field of use (e.g., food industry, biotechnology, chemistry, or pharmaceutical production).

Secondly, the cleaning process information also comprises the model description of the cleaning efficiency for each cleaning step, usually in the form of a Sinner's circle, which describes a relationship between four factors or parameters for successful cleaning: temperature, mechanical action, duration of action and cleaning agent/chemistry.

It is therefore advantageous for the model descriptions of the cleaning efficiency for each cleaning step, where the model descriptions are contained in the cleaning process information, to be stored as a formulaic relationship between the cleaning-specific parameters, e.g., temperature, duration of action and mechanical action, or in the form of a table. Using these model descriptions of the cleaning efficiency, it is then very easy to determine or calculate, for each process module, the corresponding parameter values (e.g., duration of action, throughput volume per time, or temperature) for each cleaning step based on information from the self-description information of the respective process module (e.g., internal flow ratios, surface condition, maximum achievable throughput volume, or temperature performance).

Furthermore, it is advantageous for the cleaning process information to include information about substance constants of the at least one cleaning agent used. This can be used to calculate the "Reynolds number", such as the density and/or viscosity. The substance constants of the cleaning agent, or the Reynolds number that can be determined therefrom, can also be used to calculate a minimum or maximum value of a throughput volume per time unit on the respective cleaning path. The minimum value specifies a turbulent flow that must be achieved on the respective cleaning path for the installation cleaning process. The maximum value is derived from that value that must not be exceeded if cavitation is to be avoided.

In a preferred embodiment of the inventive system, the process planning unit is configured to create the installation-specific cleaning schedule for the production process that is to be performed on the installation. In this way, a cleaning schedule specific to the installation is specially created for the production of a particular product, and can then be executed after each production (e.g., batch) for the purpose of cleaning the installation.

Alternatively or additionally, the process planning unit can also be configured to create the installation-specific cleaning schedule dynamically as a function of the respective production and/or the respective degree of soiling. The creation of the installation-specific cleaning schedule is needs-oriented in this case, e.g., according to the production of a product, where the creation of the cleaning schedule is related to, e.g., the degree of soiling of the process modules. Using dynamic creation, it is ideally also possible to create a cleaning schedule for individual installation parts or process modules in a needs-oriented manner. Therefore, e.g., installation parts can be prepared for new production or cleaned already before the production proceeds in other installation parts, thereby reducing downtimes.

Furthermore, it is advantageous to provide a communication network for an exchange of data and information between process modules, the at least one auxiliary module and the process planning unit. Depending on the installation configuration, a bus system, the Internet, wire-based and/or wireless communication networks (e.g., wireless LAN) may be provided as a communication network for the exchange of data and information.

The inventive system is ideally formed as a Cyber Physical Production System (CPPS). A Cyber Physical Production System, e.g., as described in the publications WO 2016/074728 A1 or WO 2016/074730 A1, is a system consisting of production modules that communicate with each other and with entities of the production planning and production control, and in this way allow sequence planning and sequence control of manufacturing processes or production processes of products. For an embodiment of the inventive system according to the specifications of the Cyber Physical Production System, the cleaning or CIP process is considered as a production process whose objective is not a finished product but a cleaned installation.

It is also an object of the invention to provide a method for creating and implementing a cleaning process, which is formed as a CIP process, for a CIP-compatible process installation comprising the system in accordance with disclosed embodiments of the invention. Here, the process installation to be cleaned is represented in the form of process modules, where each process module has self-description information relating to respective cleaning properties of the respective process module. In order to create the installation cleaning process, each process module requests cleaning process information from a process planning unit, where the cleaning process information contains at least the cleaning steps required for the cleaning process of the installation and model descriptions of cleaning efficiency for each cleaning step. The cleaning process information is supplemented with information based on the self-description information of the respective process modules. The process planning unit then determines a cleaning schedule that is specific to the installation, based on the cleaning process information as supplemented with the self-description information and information about auxiliary services provided by at least one auxiliary module.

Here, it can be advantageous for the process planning unit to first determine cleaning schedules for the respective process modules. These cleaning schedules for the process modules are then combined to form the installation-specific cleaning schedule. It is then easier to adapt the CIP process or the installation-specific cleaning schedule to changes in the installation configuration. In this way, cleaning schedules for installation components or installation parts that are described by process modules can also be created very easily if the need arises.

It is moreover advantageous for the installation-specific cleaning schedule that is created by the process planning unit to be executed virtually first, and for the installation-specific cleaning schedule to be supplied to a process control unit for execution at the process installation after freedom from errors has been established. In this way, it is possible to test, e.g., during the virtual execution of the cleaning schedule whether all components of the process installation are included in the cleaning, and/or whether erroneous assumptions were made in self-description information and/or cleaning process information. during the creation of the CIP framework, and/or whether errors are present in the configuration of the real installation with respect to the CIP-compatibility. The errors can therefore be detected and corrected at an early stage. It is moreover possible to calculate resources (e.g., cleaning agents, or rinsing agents) that are required for the respective specific cleaning schedule or to establish whether existing resources are sufficient.

During the execution at the process installation, the installation-specific cleaning schedule can be tested directly at the installation. If the cleaning results are unsatisfactory, then either the self-description information of the process modules or the cleaning process information stored in the process planning unit can be adapted by means of corresponding corrections (e.g., correction of erroneous assumptions in the model descriptions of the cleaning efficiency, or correction of material data), and the CIP framework or the installation-specific cleaning schedule can thus be improved and optimized.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWING

The invention is explained below by means of example with reference to the appended FIGURE, in which:

The FIGURE schematically shows an exemplary structure of a system in accordance with the invention for creating and performing an installation cleaning process for a process installation, and an exemplary execution of the associated method.

DETAILED DESCRIPTION OF THE EXEMPLARY EMBODIMENTS

The FIGURE schematically shows an exemplary structure of a system S for creating and implementing an installation cleaning process for a process installation. Here, the installation cleaning process is formed as a cleaning-in-place or CIP process, and the process installation is configured to clean in accordance with a CIP process, i.e., the installation is CIP-compatible. The system S, which represents a digital representation of the process installation with respect to the installation cleaning process, is formed as a Cyber Physical Production System (CPPS), for example.

The inventive system S has a plurality of process modules PM1, PM2, . . . , PMn, here. The process installation is represented on these process modules PM1, PM2, . . . , PMn, where the process modules represent installation parts or components that must be cleaned, e.g., kettles, tanks, containers, filters, or heat exchangers, including the associated pipelines, valves and interfaces (e.g., inlets and outlets for cleaning agents and/or rinsing agents). Self-description information SI1, SI2, . . . , SIn is stored in each process module PM1, PM2, . . . , PMn and describes the properties and compatibilities with respect to cleaning, in particular self-cleaning, that are required for the respective process module PM1, PM2, . . . , PMn. Furthermore, the process modules PM1, PM2, . . . , PMn are configured to share and transmit the respective self-description information SI1, SI2, . . . , SIn.

The self-description information SI1, SI2, . . . , SIn of the respective process module PM1, PM2, . . . , PMn here comprises at least a description of autonomous cleaning sequences such as a cleaning via a spray device in the case of a kettle, tank or possibly larger containers; a description of the interfaces that are used by the respective process module PM1, PM2, . . . , PMn for the purpose of cleaning, e.g., inlets and outlets for cleaning agents and rinsing agents and/or additional inlets and outlets if separate cleaning entities (e.g., spray device) are used; a definition of cleaning paths, where all possible paths within the respective process module PM1, PM2, . . . , PMn and all interfaces must be included; and status information relating to a respective cleaning status (e.g., clean, contaminated, or soiled) and a respective dirt saturation of the cleaning paths and interfaces defined for the respective process module PM1, PM2, . . . , PMn.

Furthermore, the self-description information SI1, SI2, . . . , SIn of a process module PM1, PM2, . . . , PMn can also manage and comprise information about properties of the defined cleaning paths. By virtue of this information, it is possible to determine values for cleaning-specific parameters for the respective process module PM1, PM2, . . . , PMn and the associated cleaning paths on the basis of model descriptions of the cleaning efficiency for each cleaning step. This additional information comprises, for example, a cleaning status (e.g., clean, contaminated); properties of the respective cleaning path, these being required in order to calculate a minimum throughput volume or (turbulent) flow that is needed for the cleaning and to calculate a maximum permissible throughput volume or flow, or to calculate the minimum and maximum Reynolds number; and material properties such as surface roughness or other specific factors of the cleaning path that have an influence on the cleaning time.

In addition, the system S has auxiliary modules HM1, . . . , HMn, from which auxiliary services for the cleaning are available.

Such auxiliary modules are, e.g., entities for providing cleaning agents and/or rinsing agents (e.g., cleaning agent and/or rinsing agent containers), entities for storage and/or preparation of cleaning agents and/or rinsing agents that are used. Furthermore, auxiliary modules HM1, . . . , HMn, such as pumps with associated control, can, for example, provide auxiliary services such as implementing a mechanical action that is required for the cleaning (e.g., pressure for steam sterilization, necessary flow of the cleaning agents or rinsing agents) or supplying cleaning agents and/or rinsing agents to a spray device. Here, the auxiliary modules HM1, . . . , HMn are not usually part of the process installation in the strict sense, but are connected to the installation via interfaces (e.g., inlets and outlets, or communication interfaces) for cleaning purposes. In the same way as the process modules PM1, PM2, . . . , PMn, for example, the auxiliary modules HM1, . . . , HMn can likewise comprise self-description information HI1, . . . , HIn that describes the available auxiliary services. Therefore, the auxiliary modules HM1, . . . , HMn are likewise configured to transmit and share information and data relating to the auxiliary services that are available. Alternatively, the information about the auxiliary services that are available from the auxiliary modules HM1, . . . , HMn can be stored directly in the process planning entity PPE so that this has access to information about the respective auxiliary services.

Furthermore, the system S comprises a process planning entity PPE. The process planning entity PPE manages and/or has access to cleaning process information RI. The cleaning process information RI can be stored, e.g., in a dedicated storage unit or in a storage unit that is integrated in the process planning unit PPE, where the storage unit can be formed as a database, for example.

The cleaning process information RI, which represents, e.g., a description of the required installation cleaning process for each material/substance, comprises at least a description of a sequence that is required for the cleaning or a description of the cleaning steps that are usually required for the installation cleaning process, e.g., alkaline rinse, clear rinse, acid rinse, clear rinse, or steam sterilization, and model descriptions of the required cleaning efficiency for each cleaning step.

The model descriptions of the required cleaning efficiency for each cleaning step are ideally established in the form of a Sinner's circle, via which a relationship between the four cleaning-specific factors or parameters (temperature, mechanical action, duration of action and cleaning agent/chemicals used) for successful cleaning is described. The respective model description of the required cleaning efficiency for each cleaning step can be stored in the cleaning process information RI as a formulaic relationship between the cleaning-specific factors or parameters (temperature, duration of action and mechanical action) or in the form of a table, in order to determine or calculate, in conjunction with the respective self-description information SI1, SI2, . . . , SIn of the respective process module PM1, PM2, . . . , PMn, the corresponding parameter values (e.g., duration of action, throughput volume per time, or temperature) for the respective cleaning step.

The cleaning process information RI also contains details of substance constants for the at least one cleaning agent that is used, or for each of the cleaning agents and rinsing agents that are used. These details and this information can then be used by the PPE for the purpose of, e.g., calculating the Reynolds number, density, and viscosity, which are required when creating an installation-specific cleaning schedule RA.

In addition to the management of the cleaning process information RI, the process planning unit PPE is configured to create a cleaning schedule RA for a specific installation. The cleaning schedule RA can be optimized to achieve minimal resource consumption. The cleaning process information RI, the self-description information SI1, SI2, . . . , SIn of the process modules PM1, PM2, . . . , PMn, and the information of the auxiliary modules HM1, . . . , HMn are used as a basis for this by the process planning unit. Here, it is possible for the process planning unit PPE to create a cleaning schedule RA just once for the particular production process that is implemented on the installation, and for the cleaning schedule RA to then be applied, e.g., after each batch of the production. Alternatively, the cleaning schedule RA can be created dynamically, i.e., after the production and/or as a function of the degree of soiling.

Furthermore, the system S has a process control unit PSE to which an installation-specific cleaning schedule RA that has been determined can be supplied after checking for freedom from errors correspondingly. The checking for freedom from errors can be performed via virtual execution on the system S, for example. For example, here a check is performed to determine whether all cleaning paths and interfaces are included in the cleaning schedule RA that has been created and cleaned accordingly. Possible errors can be corrected and a corrected cleaning schedule RA can be determined with the aid of the process planning unit PPE. The cleaning schedule RA can then be tested or used for the cleaning on the real process installation with the aid of the process control unit PSE. While the cleaning schedule RA is being performed, the process control unit PSE acts on the process modules PM1, PM2, . . . , PMn and the auxiliary modules HM1, . . . , HMn via commands.

The system S has a communication network for the exchange of information and data between the process modules PM1, PM2, . . . , PMn, the auxiliary modules HM1, . . . , HMn, the process planning unit PPE and the process control unit PSE. Depending on the respective process installation, the communication network can be formed as, e.g., a bus system, a wire-based or wireless communication system or a combination of these communication systems, and make use of, e.g., the Internet for the purpose of transmitting data and information.

The following method steps are executed in order to create and implement a cleaning schedule RA as a cleaning-in-place process for a process installation using the system S in accordance with the invention:

In a first method step 1, the process installation to be cleaned is represented in the form of process modules PM1, PM2, . . . , PMn. Stored in each of the process modules PM1, PM2, . . . , PMn is associated self-description information SI1, SI2, . . . , SIn, in which the cleaning properties of the respective process module PM1, PM2, . . . , PMn are described in relation to the CIP process. The process modules PM1, PM2, . . . , PMn know, e.g., based on production planning for the process installation or based on the respective production, the degree of soiling exhibited by individual components and which cleaning paths must be addressed.

In a second method step 2, each process module PM1, PM2, . . . , PMn requests the cleaning process information RI, in order to obtain a list of the necessary cleaning steps for the installation cleaning process and the model descriptions of the cleaning efficiency for each cleaning step from the process planning unit PPE. Here, the respective process module PM1, PM2, . . . , PMn can specify, e.g., the substance which caused the soiling for each cleaning path.

The cleaning process information RI of the process planning unit PPE can contain, e.g., a general description of the cleaning steps required for the cleaning process of the respective installation, wherein said description includes, e.g., all possible contaminating substances and/or soiled materials. Depending on the respective configuration of the installation to be cleaned and a required cleaning agent quantity, installation-specific descriptions of the cleaning steps required for the installation cleaning process can be created and managed in the cleaning process information.

In the second method step 2, the respective process modules PM1, PM2, . . . , PMn then supplement the cleaning process information RI (i.e., the descriptions of the cleaning steps required for the installation cleaning process and the model descriptions of the cleaning efficiency for each cleaning step) with information based on the respective self-description information SI1, SI2, . . . , SIn. For example, values for the cleaning-specific parameters, such as time, throughput volume per time, or temperature, are determined by the process modules PM1, PM2, . . . , PMn in this case. These values are calculated, for example, from the model descriptions of the cleaning efficiency for each cleaning step and based on properties of the respective process module PM1, PM2, . . . , PMn or the respective cleaning paths, e.g., internal flow ratios for achieving a turbulent flow, surface condition, performance of the respective process module PM1, PM2, . . . , PMn with respect to the temperature and maximum achievable throughput volume per time.

For the throughput volume per time, e.g., both a minimum and a maximum value should be considered. The minimum value in this case is predetermined by that throughput volume per time which is required to achieve a turbulent flow. The maximum value is derived, e.g., from that value which must not be exceeded if cavitation is to be avoided, or is restricted, e.g., by the maximum capacity of the respective process module PM1, PM2, . . . , PMn. Depending on surface condition, it might also be necessary to include an extension to the time that is required.

In a third method step 3, based on the cleaning process information RI that has been supplemented with information and data from the process modules PM1, PM2, . . . , PMn, and taking into account information from the auxiliary modules HM1, . . . , HMn relating to the auxiliary services that are available in each case, the process planning unit PPE then determines a cleaning sequence RA for the process installation.

In the third method step 3, cleaning schedules can first be created for the respective process modules PM1, PM2, . . . , PMn in this case, where the cleaning schedules also allow for, e.g., alternative cleaning paths within individual process modules PM1, PM2, . . . , PMn. This means that if alternative cleaning paths are available in a process module PM1, PM2, . . . , PMn, via which all parts of the process module PM1, PM2, . . . , PMn or different optimization embodiments are cleaned, alternative cleaning schedules can be determined for these embodiments. The process planning unit PPE then combines the process-module-specific cleaning schedules to form an installation-specific cleaning schedule RA, where if alternative process-module-specific cleaning schedules are available, then one is selected. As part of this combination, it must also be ensured that all interfaces between the process modules PM1, PM2, . . . , PMn are likewise cleaned or carry the flow of cleaning agents and/or rinsing agents. It is thereby possible to form longer cleaning paths within the installation, for example, and the cleaning agent and/or rinsing agent can be routed from one process module PM1, PM2, . . . , PMn to the next. In order to form such longer cleaning paths, for example, it may be necessary for the process-module-specific cleaning schedules to be split up according to the cleaning step by the process planning unit PPE, and sorted according to cleaning steps for the installation-specific overall cleaning schedule RA.

Furthermore, when determining the installation-specific cleaning schedule RA for complex and/or larger installations in which relatively long cleaning paths may be formed, e.g., storage feasibility of the cleaning agents and/or rinsing agents must be taken into consideration. Relating to this, the cleaning agent or rinsing agent can be assigned a contamination factor, e.g., according to an anticipated contamination on the cleaning path. As soon as a predetermined value for the contamination factor is exceeded due to saturation of the cleaning agents and/or rinsing agents with soiling, the cleaning path can be, e.g., interrupted and, e.g., an outflow or return for the cleaning agent or rinsing agent and an inflow for fresh cleaning agents or rinsing agents can be provided at this point. Monitoring of the dirt saturation of the cleaning agent or rinsing agent and the insertion of corresponding steps (evacuation/return of the cleaning agents and/or rinsing agents, supply of fresh cleaning agents and/or rinsing agents) into the cleaning schedule RA can be performed by the process planning unit PPE, for example.

The installation-specific cleaning schedule RA determined by the process planning unit PPE can initially be executed virtually in the third method step 3, in order to detect, e.g., errors in the representation of the installation on the process modules PM1, PM2, . . . , PMn, erroneous assumptions in self-description information SI1, SI2, . . . , SIn, or cleaning information RI, and to check whether all cleaning paths and interfaces are included in the installation cleaning process. If freedom from errors is established during the virtual execution, the cleaning schedule RA can be supplied to the process control unit PSE in a fourth method step 4 and tested on the real process installation. If, e.g., unsatisfactory cleaning results are established here, then the cause may be found in, e.g., assumptions in the self-description information SI1, SI2, . . . , SIn of the process modules PM1, PM2, . . . , PMn, or in the cleaning information RI with a corresponding correction, a corrected or optimized cleaning schedule RA can be created for the installation with the aid of the inventive system S.

Furthermore, following creation of the cleaning schedule RA, all active assumptions relating to cleaning efficiency, geometric and fluidic ratios of the installation and all cleaning steps are available in the process planning unit PPE and in the process modules PM1, PM2, . . . , PMn. This data can be used in structured form as documentation and/or for validation of the CIP process, for example, whereby the CIP process can easily be documented effectively and clearly with the aid of the inventive system S.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A system for creating and implementing an installation cleaning process for a process installation, the installation cleaning process being formed as a cleaning-in-place process and the process installation being configured to be cleaned via the cleaning-in-place process, the system comprising:
   a processor;
   memory which stores process cleaning information;
   a plurality of process modules, each process module of the plurality of process modules representing a respective process installation to be cleaned, said plurality of process modules each storing respective self-description information relating to each respective cleaning property, and each process module of the plurality of process modules being configured to transmit or share the respective self-description information;
   at least one auxiliary module which provides auxiliary services for the installation cleaning process, the at least one auxiliary module being configured to transmit or share information about respective auxiliary services; and
   a second processor which accesses the cleaning process information stored in the memory, said cleaning process information comprising at least cleaning steps which are required for the installation cleaning process and model descriptions of cleaning efficiency for each cleaning step, the second processor being configured to determine an installation-specific cleaning schedule based on the cleaning process information, the self-description information of the process modules, and the information of the at least one auxiliary module;
   wherein the process installation is cleaned via the cleaning-in-place process in accordance with the determined installation-specific cleaning schedule; and
   wherein the self-description information comprises (i) at least a description of autonomous cleaning sequences, (ii) status information relating to a respective cleaning status and a respective dirt saturation of respective cleaning paths and interfaces of the corresponding process module, the respective cleaning status being utilized to calculate a minimum throughput or flow of at least one cleaning agent on the respective cleaning paths and to calculate a maximum permissible throughput or flow of the at least one cleaning agent to prevent cavitation from occurring, and (iii) material properties comprising surface roughness which have an influence on a cleaning time.

2. The system as claimed in claim 1, wherein a determined installation-specific cleaning schedule is supplyable to the processor for execution.

3. The system as claimed in claim 2, wherein the self-description information of the respective process module further comprises a description of interfaces used for the cleaning and a definition of cleaning paths.

4. The system as claimed in claim 2, wherein the self-description information of the respective process module further comprises information relating to the respectively associated cleaning paths, via which values for cleaning-specific parameters for the respective process module and the associated cleaning paths based on model descriptions of the cleaning efficiency for each cleaning step are determinable.

5. The system as claimed in claim 2, further comprising:
   a communication network for an exchange of data and information between the process modules, the at least one auxiliary module, the second processor, and the processor.

6. The system as claimed in claim 1, wherein the self-description information of the respective process module further comprises a description of interfaces used for the cleaning and a definition of cleaning paths.

7. The system as claimed in claim 6, wherein the self-description information of the respective process module further comprises information relating to the respectively associated cleaning paths, via which values for cleaning-specific parameters for the respective process module and the associated cleaning paths based on model descriptions of the cleaning efficiency for each cleaning step are determinable.

8. The system as claimed in claim 1, wherein the self-description information of the respective process module further comprises information relating to the respectively associated cleaning paths, via which values for cleaning-specific parameters for the respective process module and the associated cleaning paths based on model descriptions of the cleaning efficiency for each cleaning step are determinable.

9. The system as claimed in claim 1, wherein the model descriptions of the cleaning efficiency for each cleaning step, which are contained in the cleaning process information, are stored as one of (i) a formulaic relationship between the cleaning-specific parameters and (ii) a table.

10. The system as claimed in claim 1, wherein the cleaning process information additionally contains information relating to substance constants of at least one cleaning agent utilized.

11. The system as claimed in claim 1, wherein the second processor is further configured to create the installation-specific cleaning schedule for each production process which is performed on the process installation.

12. The system as claimed in claim 1, wherein the second processor is configured to create the installation-specific cleaning schedule dynamically as a function of at least one of (i) the respective production and (ii) degree of soiling.

13. The system as claimed in claim 1, wherein the system is formed as a Cyber Physical Production System.

14. A method for creating and performing an installation cleaning process for a process installation utilizing a system for creating and implementing an installation cleaning process for a process installation, the installation cleaning process being formed as a cleaning-in-place process and the process installation being configured to be cleaned via the cleaning-in-place process, the method comprising:

representing the process installation to be cleaned as a plurality of process modules, each process module of the plurality of process modules storing respective self-description information relating to respective cleaning properties and each process module of the plurality of process modules being configured to transmit or share the respective self-description information;

requesting, by each process module, cleaning process information from a processor, said cleaning process information comprising at least those cleaning steps and model descriptions of cleaning efficiency for each cleaning step which are required for the installation cleaning process, and supplementing said cleaning process information with information and data based on the respective self-description information;

determining, by the processor, a cleaning schedule which is specific to the installation based on the supplemented cleaning process information and information relating to auxiliary services provided by at least one auxiliary module; and cleaning the process installation via the cleaning-in-place process in accordance with the determined installation-specific cleaning schedule;

wherein the self-description information comprises (i) at least a description of autonomous cleaning sequences, (ii) status information relating to a respective cleaning status and a respective dirt saturation of respective cleaning paths and interfaces of the corresponding process module, the respective cleaning status being utilized to calculate a minimum throughput or flow of at least one cleaning agent on the respective cleaning paths and to calculate a maximum permissible throughput or flow of the at least one cleaning agent to prevent cavitation from occurring, and (iii) material properties comprising surface roughness which have an influence on a cleaning time.

15. The method as claimed in claim 14, wherein cleaning schedules are initially determined for the respective process modules; and wherein the cleaning schedules for the process modules are subsequently combined to form the installation-specific cleaning schedule.

16. The method as claimed in claim 14, wherein the installation-specific cleaning schedule created by the process planning unit is initially executed virtually; and wherein the installation-specific cleaning schedule is supplied to a process controller for execution on the process installation after freedom from errors has been established.

* * * * *